Oct. 31, 1933.  C. HELD  1,933,112
MULTICORE HIGH TENSION ELECTRIC CABLES
Filed Jan. 19, 1931
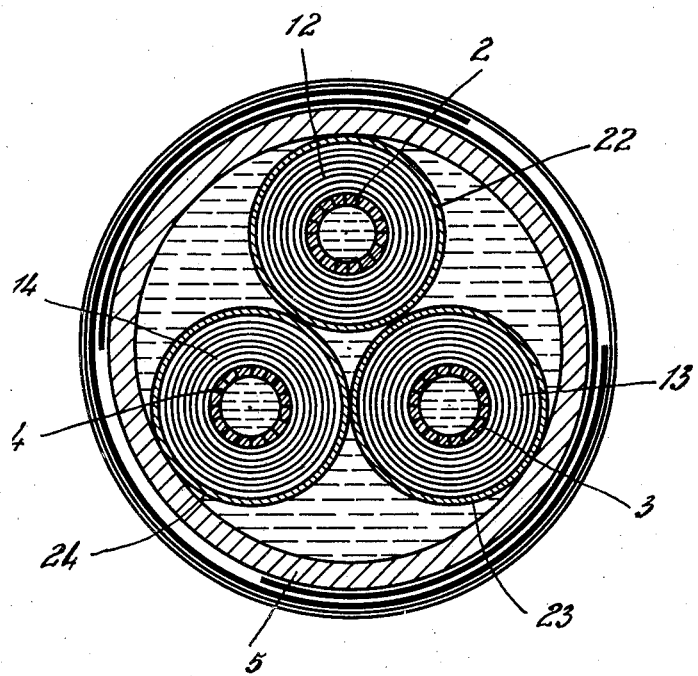
Inventor
Christian Held
by Knight Bros
Attorneys Patented Oct. 31, 1933

1,933,112

UNITED STATES PATENT OFFICE 1,933,112

MULTICORE HIGH TENSION ELECTRIC CABLES

Christian Held, Berlin-Charlottenburg, Germany, assignor to Siemens-Schuckertwerke Aktiengesellschaft, Berlin-Siemensstadt, Germany, a corporation of Germany Application January 19, 1931, Serial No. 509,753, and in Germany January 25, 1930

4 Claims. (Cl. 173—266)

This invention relates to multi-core high tension electric cables.

Heretofore in the manufacture of oil-filled cables of this type it has been usual to fill out the wedge-shaped spaces between the individual cores with filling material, generally paper cord. The cable thus formed was then dried and impregnated with oil. Upon covering the cable with the lead sheath common to all the conductors, however, upon the way from the impregnating vessel to the press the wedge-shaped spaces run almost entirely empty again, and it is difficult completely to replace again the oil that has been lost when the lead sheath has once been placed in position, since for forcing the oil through the spaces which are already fairly tightly packed with filling material a considerable pressure and much time are required, particularly in the case of long cables. Furthermore in the case of such cables it is absolutely essential that the lead sheath should be perfectly tight, as otherwise with cables already laid and working great oil losses with consequent breakdowns may occur.

Oil-filled cables have also previously been constructed by building up multi-core cables from several single core cables stranded together, a separate lead sheath being provided for each core. The sheathing of the individual cores is then easily effected, and the loss of oil which then occurs, in general only slight, can be easily made good, especially when the conductor of the core is made as a hollow conductor. In order to protect the lead sheaths of the individual cores against expansion due to the internal pressure, each lead sheath was usually surrounded with a metal wrapping for which however, in order to avoid magnetizing losses, it was compulsory to use expensive non-magnetic material. A further disadvantage of cables comprising several lead covered single core cables is that leakages of the lead sheaths, especially when such leakages occur in the proximity of the inner wedge-shaped spaces, can only be determined with difficulty, and, as they are difficult of access, they cannot be easily remedied. In order to obtain increased security of the lead sheaths against leakage, both in the case of multi-core cables with a common lead sheath and also in the case of cables consisting of several single core cables stranded together, it has been proposed to press a further lead sheath over each lead sheath. This, however, necessitates a substantially greater expenditure, both as regards lead and even more particularly as regards labor, and it is therefore by no means economical. Further this step also does not afford any absolute guarantee against the escape of oil, because there may be simultaneous leakage of both the inner and the outer lead sheath.

The present invention has for its object to avoid the disadvantages previously mentioned with cables as heretofore usually constructed. For this purpose according to the present invention a multi-core high tension electric cable comprises a number of cores stranded together, each core being provided with a lead sheath, preferably of a thin type, and one common lead sheath enclosing the stranded cores, whilst the spaces between the cores and the common lead sheath and also between the cores are filled with a liquid or viscous fluid insulating medium instead of with the paper or jute fillings hitherto generally used. The liquid or viscous fluid insulating medium employed is preferably the same as that used in impregnating the individual cores. In order to economize oil, there may be arranged in the intermediate spaces wires, metal tubes or the like. As a protection against stretching of the lead sheath and against mechanical injury from external sources one of the usual types of armouring may be provided over the common lead sheath.

In order that the said invention may be clearly understood and readily carried into effect, the same will now be described more fully with reference to the accompanying drawing which is a sectional view illustrating one construction of cable according to the invention. 2, 3 and 4 are the three hollow conductors of a high tension cable; 12, 13, 14 show the paper insulation wound upon the conductors, which insulation is impregnated with oil whilst the interior of the hollow conductors is also filled with oil. 22, 23, 24 are the thin lead sheaths pressed upon the insulation 12, 13 and 14 of the conductors 2, 3, 4. 5 is the lead sheath common to the three cable cores, which sheath, as a protection against injuries, is provided with an iron band armouring. The intermediate spaces betwen the lead sheath 5 and the three cores and the intermediate space between the three conductors are filled with oil in the same way as the cores themselves.

Cables according to the present invention afford the advantage that upon sheathing the individual cores the loss of oil from the insulation is only slight and can easily be made good from the hollow conductor. A further substantial advantage consists in the fact that leakages of the lead sheaths of the cores are perfectly harmless because the spaces are entirely filled with oil, and oil cannot therefore escape from the individual cores. Moreover, in electrical respects such leakages in the lead sheaths cannot harm the individual cores because a distortion of the electric field through small cavities or cracks in the lead sheaths practically does not occur. Consequently the lead sheaths can be made as thin as is possible in manufacture. Should leaky spots be already observed in the lead sheaths of the cores during manufacture, then these flaws can be easily made good by soldering. Owing to the fact that only thin lead sheaths are required for the individual cores, a considerable saving in lead is effected. Should, contrary to expectation, the lead sheath common to all the cores get leaky at any time, then as it is easy of access it can be easily repaired. Since as already mentioned, leakages in the individual lead sheaths cannot give rise to breakdown, it is also unnecessary to provide each lead sheath of a core with a separate armouring. In this way a saving in expensive non-magnetic material is also effected since, for the armouring of the common lead sheath, use can be made of one of the ordinary cheap iron bands, as magnetizing losses for multi-core cables may be disregarded. Furthermore in the construction of cable according to the present invention there is the advantage that corrosion cannot take place between the lead and the armoring material, as is the case with several stranded single core cables armoured with non-magnetic material.

What I do claim as my invention and desire to secure by Letters Patent is:—

1. An electric high tension cable comprising a plurality of insulated hollow conductors twisted with one another and provided with an outer lead sheath common to and enclosing all of the insulated hollow conductors, each of said insulated hollow conductors being covered with an individual lead sheath and filled with an impregnating fluid, the spaces between said lead sheaths of the insulated hollow conductors and said outer common lead sheath being filled with a fluid which is free from artificial pressure and similar in dielectric properties to the impregnating fluid filling said insulated hollow conductors.

2. An electric high tension cable as claimed in claim 1, in which said individual lead sheaths for the hollow conductors are made with relatively thin walls for confining the impregnating fluid to the insulated hollow conductors until after the outer lead sheath common to all of said insulated hollow conductors has been applied thereto, the filling fluid in the spaces between the individual lead sheaths and between them and the outer common lead sheath being under substantially the same pressure as said impregnating fluid in the insulated hollow conductors.

3. An electric high tension cable comprising a plurality of twined insulated hollow conductors separately covered by individual lead sheaths provided with walls of minimum requisite thickness to confine an insulating fluid free from artificial pressure, said insulated hollow conductors being filled with an insulating fluid free from artificial pressure and the insulations therefor being impregnated with said fluid, and an outer lead sheath common to and enclosing all of the insulated hollow conductors, the spaces between said lead sheaths of the insulated hollow conductors and said outer common lead sheath being filled with a fluid substantially free from artificial pressure and having the same dielectric properties as the fluid which fills said hollow conductors and impregnates the insulation for said hollow conductors.

4. An electric high tension cable comprising a plurality of hollow conductors filled with oil, insulation impregnated with oil surrounding each of said hollow conductors, an individual seamless lead sheath enclosing each of said insulated hollow conductors, said insulated and sheathed hollow conductors being twined together, an outer lead sheath common to and enclosing all of the individually sheathed insulated hollow conductors and insulating oil substantially free from artificially applied pressure and having predetermined dielectric properties, said insulating oil filling said hollow conductors and the intermediate spaces between the individual lead sheaths and between the outer common lead sheath and said individual lead sheaths, the walls of said individual lead sheaths being of minimum thickness for maintaining the separation of the insulating oil outside of said sheaths from the insulation therewithin.

CHRISTIAN HELD.